No. 869,868. PATENTED OCT. 29, 1907.
I. H. SPENCER.
ORGAN BLOWING APPARATUS.
APPLICATION FILED JAN. 12, 1905.
2 SHEETS—SHEET 1.
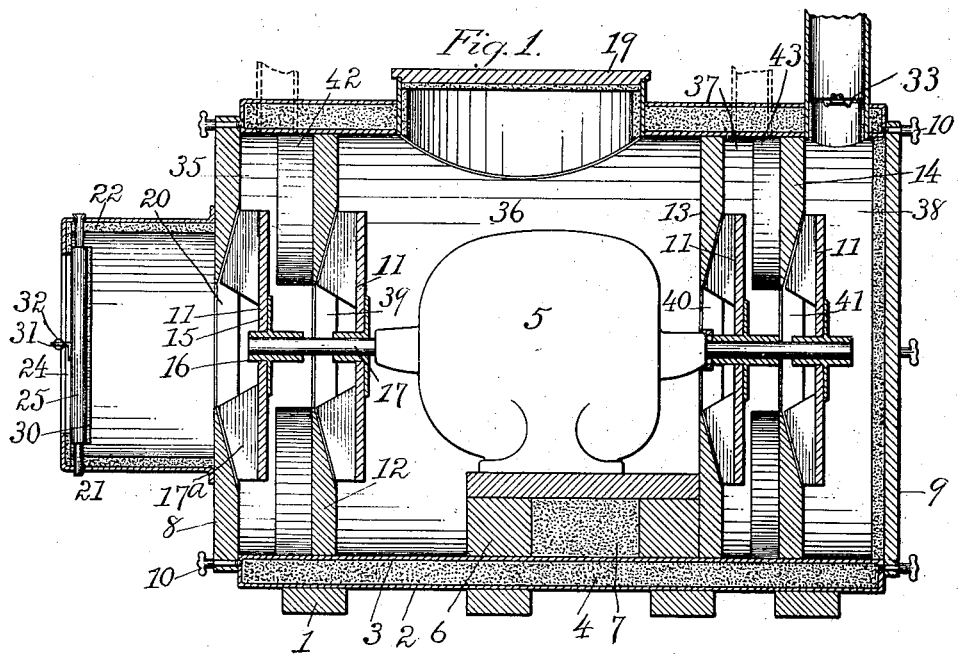
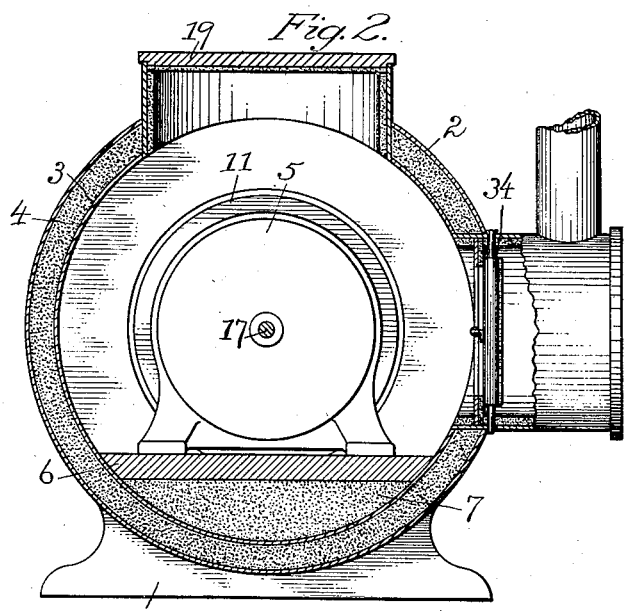
Witnesses.
C. H. Storrs.
L. E. Berkovitch.
Inventor.
Ira H. Spencer
per
Jenkins & Barker,
Attorneys.

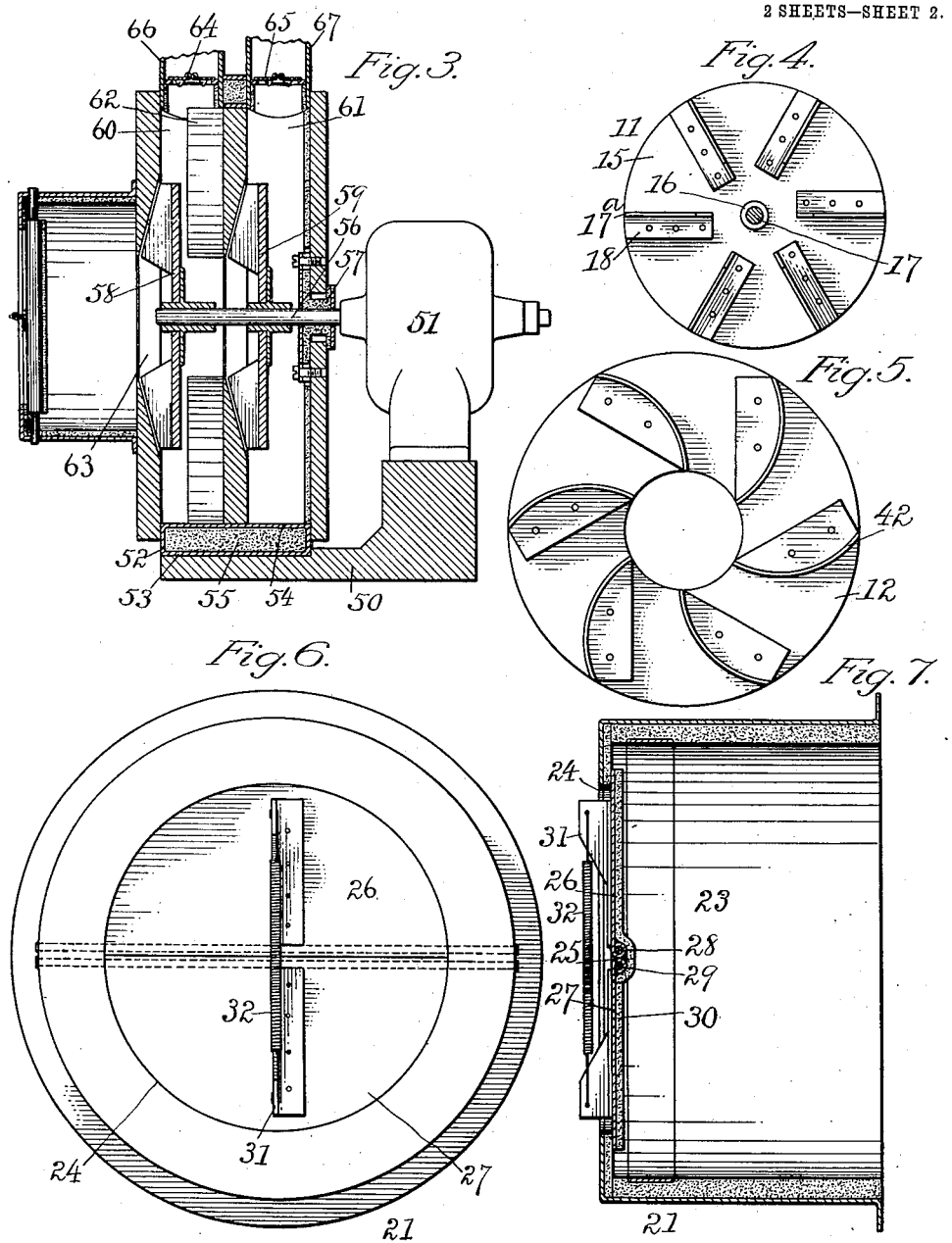

UNITED STATES PATENT OFFICE.

IRA H. SPENCER, OF HARTFORD, CONNECTICUT, ASSIGNOR TO THE ORGAN POWER COMPANY, OF HARTFORD, CONNECTICUT, A CORPORATION OF CONNECTICUT.

ORGAN-BLOWING APPARATUS.

No. 869,868.　　　　　Specification of Letters Patent.　　　Patented Oct. 29, 1907.

Application filed January 12, 1905. Serial No. 240,712.

*To all whom it may concern:*

Be it known that I, IRA H. SPENCER, a citizen of the United States, and a resident of Hartford, in the county of Hartford and State of Connecticut, have invented a certain new and useful Improvement in Organ-Blowing Apparatus, of which the following is a specification.

The invention relates primarily to blowers which, of course, may be used for any desired purpose, the particular design herein shown being well adapted for the specific purpose of organ blowing apparatus.

The primary object of the invention is to secure a blower of the greatest possible efficiency with a comparatively small power consumption.

A further object is to produce an efficient blower which will be practically noiseless in operation, the arrangement of the parts being such that the entire mechanism may be wholly inclosed in an insulated casing with sound impeding walls.

A still further object is to arrange in connection with a blower automatic mechanism by which the transmission of sound will be prevented either at the inlet or outlet openings of the casing or both, but will cause no loss of air pressure under certain conditions. In other words, when the flow of air is slight the sound checking mechanism is in position to prevent passage of sound, but when a large volume of air is passed through the blower the check mechanism will open to such an extent as to cause no loss through impediment to the passage of air.

Referring to the drawings: Figure 1 is a sectional view through the casing showing the compound arrangement of fans and check valves. Fig. 2 is a transverse section through the parts shown in Fig. 1. Fig. 3 illustrates a slightly modified form of blower in which the driving motor is arranged outside of the blower casing. Fig. 4 illustrates a face view of the fan disk and blades. Fig. 5 is a face view of the deflectors, which are arranged adjacent to the fans. Fig. 6 is a front face view of the check valve. Fig. 7 is a sectional view of the same.

In Figs. 6 and 7 the parts are shown in a different position from that illustrated in Figs. 1 to 3 of the drawings.

One of the peculiar and important features of the herein described invention resides in the construction and arrangement of the blower disks or fans which are used. These are so constructed that they are of the simplest and lightest construction, and a number of them may be mounted upon a single motor shaft without overburdening said shaft, and, by the peculiar arrangement hereinafter described may be nicely adjusted to prevent air leakage and inefficiency.

The fans really comprise a disk of light material and having vanes extending from the face thereof and projecting into proximity with the wall of the casing or blower chamber. The arrangement is such that the disk carrying the vanes forms one wall of a pressure producing chamber, the casing forming the opposite wall, and as the parts can be nicely adjusted there need be no side leakage about the fan. The pressure, of course, in each fan chamber is raised by the centrifugal action of the air thrown off from the blades of the fan.

In the accompanying drawings, referring first to Figs. 1 and 2, the numeral 1 denotes a base or support carrying an outer metallic casing 2 which is preferably formed of sheet metal and has within it a second casing 3. Between the walls of the outer and inner casing is a sound and fire proof material 4 which completely fills the opening between the walls of the casing. As shown in Figs. 1 and 2, a motor 5 is supported within the inner casing, and its base 6 is also stuffed as to the hollow parts with a sound and fireproof material 7. The casing as to either end has heads 8 and 9 secured in place in any desired manner as by thumb bolts 10. The motor 5 has its shaft projecting toward either end of the casing, and upon this shaft are borne a number of fans or blowers 11, each fan being arranged in a separate chamber into which the casing is divided as by partitions 12—13 and 14.

The fans are of somewhat peculiar construction, more fully illustrated in Fig. 4. They each comprise a disk 15 which may be suitably mounted in any desired manner upon a hub 16 and secured to the motor shaft 17. The disk 15 for convenience is shown herein as having considerable thickness, although in practice it is preferably formed from very light wood, aluminium or sheet metal, and has projecting from its face and arranged at substantially right-angles thereto blades 17$^a$. These blades are also preferably formed of very light metal and are bent up at the foot as at 18 to form a convenient and light means of securing them to the disk.

The main casing is preferably provided with a manhole 19 through which the motor 5 is usually accessible. The inlet opening for air is designated by 20, and surrounding this opening is an annular casing 21 of sheet metal completely packed with a sound impeding and fireproof material 22. This material as illustrated in Fig. 7 is at the outer end of the annular casing, held in place by a ring 23.

The casing 21 is open at its outer end as at 24, this opening being normally closed by a check valve 25. The check valve is of peculiar construction and consists of two coöperating shutter-sections 26—27 of semicircular form, hinged or pivoted at their adjacent edges on vertically disposed pivots 28—29. In practice these shutters are formed of sheet metal and are completely covered with an insulating material 30. Projecting from the outer face of each of the shutter sections is a fin 31 and attached to each of these fins is a resilient member or spring 32. It is to be observed that the line of opening of the shutter sections is substantially at right angles to the line of pull upon the spring 32. This spring, of course, exerts its greatest influence when in a position shown in Figs. 1 to 7 of the drawings. It is obvious from this arrangement of shutter sections and spring that the maximum pull of the spring is secured when the shutter sections are pulled against the inner face of the casing to close the opening 24. As the shutter sections are pulled inward by the suction of the air induced by the fans or blowers the force of the spring 32 is weakened by having its center pulled against the pivot points or hinge of the shutters, whereupon it is simply folded back upon itself and is not pulled lengthwise to exert a heavier tension. In other words, the maximum pull of the spring is secured when the shutter sections are closed, and as they open the effect of the spring is decreased, permitting said shutter sections to open to the full width without any great pressure being applied to them.

As shown in the drawings, the check valve is used on the inlet opening and also on the outlet openings, as indicated at 33, Fig. 1, and 34, Fig. 2. The object of using the check valve at the outlet opening is to prevent noise induced in the tubes or pipes which are ordinarily used to connect a blower casing with an organ. The object and utility of the check valve is obvious, particularly when the mechanism is used for organ blowing, where it is absolutely essential to reduce noise to the greatest possible extent.

When the fans are running under ordinary conditions and no great volume of air is being taken out of the casing, a comparatively small amount of work is being performed by the motor, and ordinarily the organ or like mechanism is making little sound. At such times the air shutters are practically closed. As the volume of air used by the organ increases the work on the motor proportionately is increased, as well as the sound induced thereby. Thereupon the shutter is fully open and offers no impediment to the passage of air. Under these conditions, however, the organ which is being pumped is making a sufficient noise to completely cover the hum which might escape through the open valve.

It will be seen that the valve is absolutely automatic, and depends entirely upon the air used from the blower in its operation, and offers substantially no impediment to the passage of air when a large volume of air is required.

As heretofore stated, the blower casing is by the partitions 12—13 and 14 divided into a number of pressure chambers 35—36—37 and 38, and each chamber has opening into the next preceding chamber air inlets 39—40 and 41, concentrically arranged with relation to which are the fans or blowers 11. Arranged upon the walls of the chamber are deflectors 42 and 43, which are preferably of curved form as indicated in Fig. 5, and which project from the wall of the chamber toward the blowers or fans.

The deflectors with the wall form open deflector channels opening directly to the fan, and as the deflectors extend substantially across and outside the fan they impede all the air moving in a circular movement, as it is thrown off from the edge of the fan blades, and will conduct said air directly to the inlet opening of the next blower. This is done without frictional loss, as the deflector channels are open, and unimpeded. A further advantage of this arrangement of deflectors is that the fans may be made interchangeable and varying diameters of fans may be used with the same deflectors.

Obviously the whole purpose of the deflectors is to break up the circular movement of the air as it leaves the fan and divert it under its increased pressure to the next succeeding fan, where it will be immediately picked up and raised to a still higher pressure. These deflectors are so arranged as to break up the whirling or circular movement of the air induced within the chamber by the fan and cause said air under its induced pressure to flow back to the center of the next succeeding fan. This fan in turn picks up the air and raises its pressure, passing it on to the succeeding chamber. It will thus be seen that the initial pressure of the air is raised step by step in each chamber, and if desired an outlet may be taken from each chamber to give several different pressures to the organ or a single high pressure tube may be connected with the high pressure chamber 38.

In the chamber 36 it is not essential that there be a set of deflectors, inasmuch as the motor and appurtenant parts break up the circular movement of the air. No deflectors are therefore shown in this chamber, although they might be used with the result of increased efficiency.

In Fig. 3 of the drawings there is shown a slightly modified arrangement in which the motor is placed outside of the sound proof casing. Referring to this figure, the numeral 50 denotes a base upon which the motor 51 and fan casing 52 are mounted. The fan casing as in the case heretofore described, is of the same general construction, having an outer sheet metal casing 53 and an inner casing 54 supported by packing 55. A motor shaft 56 extends through a stuffing box 57 in one wall of the casing, this box being arranged to permit free movement of the shaft without transmission of vibration to the casing and without cramping the bearings. Upon the shaft are mounted blowers 58—59 of the same construction shown in Figs. 1 to 5 inclusive. Each of these fans or blowers is arranged in a separate chamber 60—61 and deflectors 62 are arranged on the wall of the chamber 60 to bring the air back to the center of the fan 59. The same form of air valve heretofore described is used over the inlet opening 63 and automatically opens and closes to make the blower casing substantially sound proof even at the inlet opening. Air shutters or valves 64—65 are also shown in the outlet openings 66—67, and in this instance there is an opening from each of the pressure chambers 60—61 in order that a plurality of supplies of different pressures may be used.

It is to be noted that in either of the forms hereinabove shown and described there is a sound proof casing completely inclosing the blower fans, and that even the inlet opening for the air is provided with means for preventing passage of sound.

The devices shown illustrate a practical and convenient means of stepping up the pressure of air by centrifugal blowers whereby almost any desired pressure may be secured by using a sufficient number of blower chambers and appurtenant parts.

Of course, it is understood that the number of blowers is immaterial and may be increased or diminished to suit the exigencies of any particular case, and, in fact, various detailed changes might be made in the arrangement without materially departing from the spirit or intent of the invention.

What I claim as my invention and desire to secure by Letters Patent is:—

1. A wind pressure device comprising a sound proof casing provided with a blower arranged therein and adjacent to its wall, and with an inlet opening and a variable tension device for automatically controlling the air inlet and preventing the passage of sounds, said automatic variable tension device depending for operation upon the force and volume of air passing through the device.

2. A wind pressure device comprising a sound impeding casing, a centrifugal blower arranged within the casing and adjacent to its wall, an air inlet forming a part of said casing and provided with a valve, a variable tension device for automatically closing said valve, said tension device being actuated to a greater or less extent dependent upon the suction of the blower.

3. A wind pressure device comprising a casing, a centrifugal blower arranged within the casing and adjacent to its wall, an air inlet to said casing normally closed by a pair of interconnected pivoted wings forming a valve, a variable tension device for holding said wings normally closed, said wings being opened to varying degrees dependent upon the volume of air passing through the device.

4. A wind pressure device comprising a sound impeding casing completely inclosing a motor and a directly connected blower, said casing having a part extending about the air inlet to the blower, an air shutter arranged appurtenant to the casing, and resilient means for normally holding said air shutter in closed position, and arranged to decrease its pull upon an opening of the air shutter.

5. A wind pressure device comprising a sound impeding casing completely inclosing a centrifugal blower and provided with an air inlet appurtenant to said blower, an air shutter operatively arranged with reference to the air inlet and adapted normally to close it, resilient means for holding said air shutter in normally closed position, and arranged to decrease its pull upon the opening of the shutter.

6. In combination in a wind pressure device comprising a sound impeding casing and one or more fan blowers arranged therein, an air inlet to said casing, an air shutter normally closing said inlet, said shutter comprising a pair of wings pivoted at their adjacent edges, means for normally holding said wings in closed position, said holding means arranged to lose its active force upon an opening of the wings.

7. In combination in a wind pressure device including a casing and a blower arranged therein, an air inlet to said casing, an air shutter arranged appurtenant to said inlet and including a hinged member, means for holding said hinged member in closed position, and means dependent upon the position of said hinged member for releasing the pull of the holding means as the hinged member is opened.

8. In combination in a wind pressure device including a casing surrounding a blower fan and having an air inlet, an air shutter appurtenant to said inlet and comprising two semi-circular sections pivoted at their adjacent edges, a resilient member normally holding said hinged sections in closed position, said member attached to each of said sections and extending between them at substantially right-angles to their line of opening.

IRA H. SPENCER.

Witnesses:
ARTHUR B. JENKINS,
L. E. BERKOVITCH.